May 1, 1962    N. K. WESLEY    3,031,927
BIFOCAL CORNEAL CONTACT LENS
Filed March 3, 1958
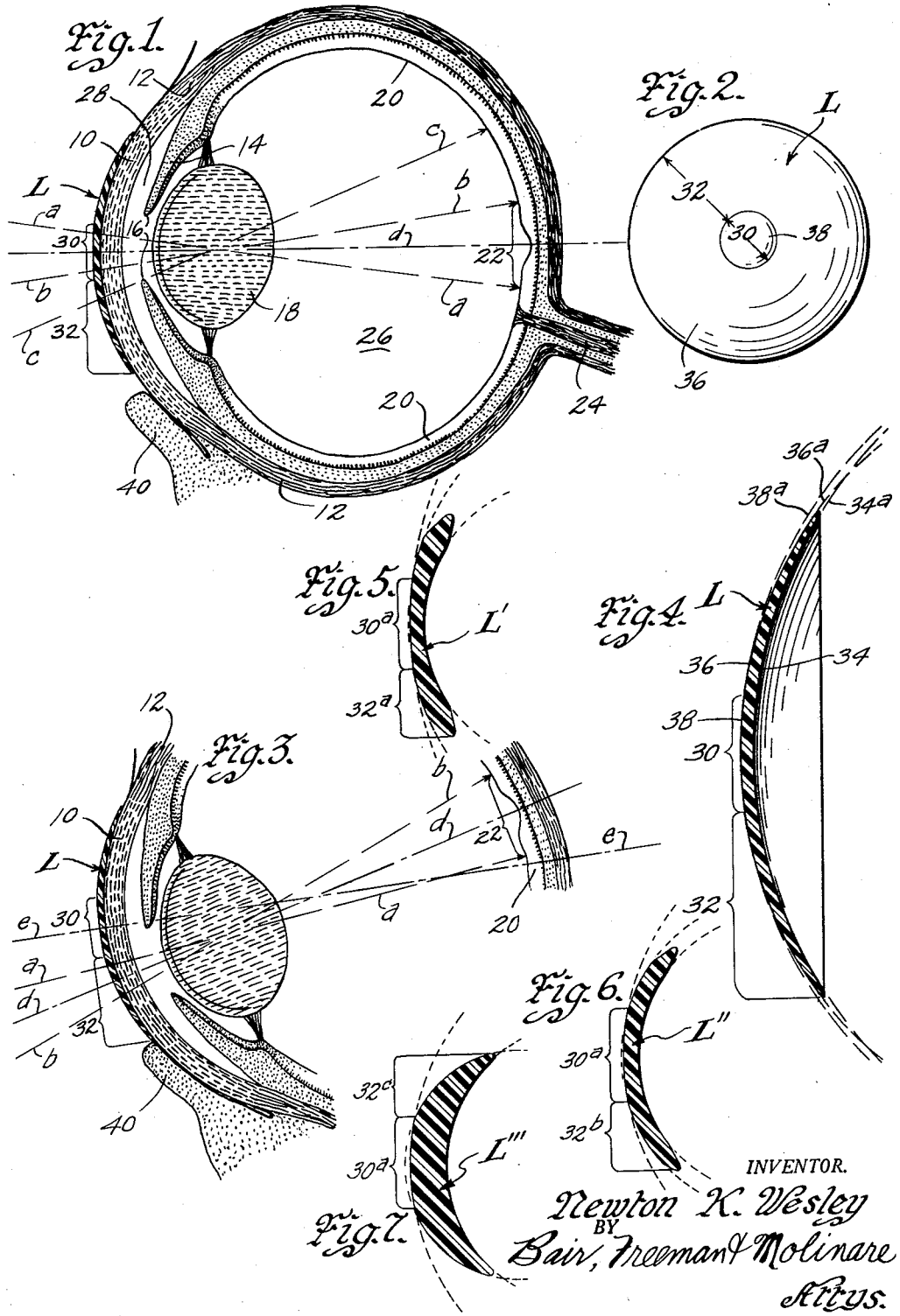
INVENTOR.
Newton K. Wesley
BY Bair, Freeman & Molinare
Attys.

United States Patent Office 3,031,927
Patented May 1, 1962

3,031,927
BIFOCAL CORNEAL CONTACT LENS
Newton K. Wesley, Chicago, Ill., assignor to The Plastic Contact Lens Company, Chicago, Ill., a corporation of Illinois
Filed Mar. 3, 1958, Ser. No. 718,851
2 Claims. (Cl. 88—54.5)

This invention relates to a corneal contact lens which is novel in that it is bifocal in character. Specifically the lens has one zone of one power and another zone of a different power. One zone may be an annular outer zone surrounding an inner zone.

One object of the invention is to provide a bifocal corneal contact lens in which the zones may be differently powered for both far and near visual correction, thereby considerably extending the usefulness of corneal contact lenses which at present are primarily designed with but a single power for compensating for hyperopia or myopia by modifying the effective focal length of the lens of the eye so that the image within a certain range of vision is focused on the retina rather than behind it or in front of it.

Another object is to provide a bifocal corneal contact lens which can be designed for use by hyperopes for both far and near visual correction by providing the lens with a central zone of relatively low positive power for normal distant seeing and a relatively higher positive powered outer zone for close seeing such as reading and the like, and in which the lens is subject to central vision through the central zone when the eye looks straight ahead, but due to lag of the lens with respect to the cornea when the eye is cast downwardly the outer zone of the lens is then subject to central vision, thus providing the desired greater magnification in the downcast position of the eye regardless of the circumferential position of the contact lens which cannot be kept in one position against rotation as in ordinary bifocal spectacles but rather tends to rotate with each blinking of the eyelid. The lens can also be designed for myopes by providing a negative central zone for distant vision rather than a positive central zone as thus far referred to. The outer zone would be a different power than the inner zone, and the lens may be trifocal in cases of extreme hyperopia or myopia. The outer zone or zones may be either positive or negative in effect as required for the particular patient to which they are fitted.

Still another object is to provide a corneal contact lens having dual zones of power either both positive, both negative, or one positive and the other negative, so that rays of light passing through the lens are magnified or minified to various selected degrees by the different zones of the lens for impingement upon different portions of the retina such as the portion thereof involving central vision as distinguished from the remainder of the retinal area involved in peripheral vision.

A further object is to provide a dual-zone corneal contact lens in which the inner zone of the lens may not have magnifying or minifying power for distant vision as none is required, while the outer zone is powered to correct for visual deficiency, or the zones may be reversed for certain patients.

Still a further object is to provide a corneal contact lens that provides two or more different zones (not necessarily concentric with each other) for correction for visual deficiency at different distances of subjects from the eye.

An additional object is to provide a multi-zone corneal contact lens having a zone of one power and one or more other zones of different powers which do not necessarily surround the first zone, said lens being thereby useful in connection with special activities of the patient wearing the lens.

With these and other objects in view, my invention consists in the construction, arrangement and combination of the various parts of my bifocal corneal contact lens, whereby the objects above contemplated are attained, as hereinafter more fully set forth, pointed out in my claims and illustrated in detail on the accompanying drawing, wherein:

FIG. 1 is a vertical diagrammatic cross-section through the human eye showing a typical form of my bifocal corneal contact lens in wearing position thereon with the eye looking straight ahead for central vision through the central zone of the lens;

FIG. 2 is a front elevation of the lens shown in FIG. 1;

FIG. 3 is a sectional view somewhat similar to FIG. 1 in which the eye has shifted to a downcast position and the outer zone of the lens is in operation as far as central vision is concerned;

FIG. 4 is an enlarged cross-section of the lens including reference arcs to explain the difference in power of the inner and outer zones of the lens, to illustrate a central zone of relatively low plus power and an outer zone of relatively high plus power for use by a hyperope to correct for both far and near vision; and FIGS. 5, 6 and 7 are cross-sections of lenses somewhat similar to FIG. 4 and showing different combinations of powers in the central and outer zones of the lenses, the curvatures of the surfaces and the thickness of the lenses being exaggerated to better illustrate the problems involved.

In FIG. 1 I have used the reference numeral 10 to indicate in general the cornea of the eye. The cornea has a central apical area which is substantially spherical and a peripheral area surrounding the central area which departs from the spherical shape of the apical area, being somewhat flatter or of greater radius, the radius increasing (but somewhat irregularly) away from the apical area.

Surrounding the cornea 10 is the sclera 12 or white portion of the eye. The transition from cornea to sclera is the limbus which defines the limbal area within which a corneal contact lens is usually positioned. Just back of the cornea 10 is the iris or diaphragm 14 which defines the iris opening or pupil 16. The sensory end organ of the eye is the retina 20 which includes a central vision area 22 comprising a group of visual cells surrounding a central optical rod or rhabdom (which is usually termed the fovea centralis). The rest of the retina 20 involves peripheral vision.

Man has "camera" eyes including a lens 18 suspended between a chamber 26 containing vitreous humour and a chamber 28 containing aqueous humour. The rear of the chamber 26 is lined with the retina 20. The cornea 10 acts as a lens in front of the chamber 28 and of course is transparent, its apparent color being that of the iris 14. The iris is activated bu muscles which control the size of its central opening or pupil 16 through which light enters the eye. Light passing through the lens 18 is focused on the retina as an image and the varied stimuli act on nerve endings of the retina to result in a definite mental picture transmitted to the brain by the optic nerve 24. The eyes are provided with muscles which direct them toward objects to be observed. They also have muscular focusing devices which control the curvature of the lens 18 and thus its focus with respect to the retina.[1]

In normal eyes the image is focused sharply on the retina by automatic reflex action of the muscles for the lens 18 but the ability to focus generally deteriorates ---
[1] Van Nostrand's Scientific Encyclopedia, 2nd ed., 1947, page 555.

with age (after about age 45) and a person develops presbyopia (old sight). The deterioration may be hyperopic or myopic. Also, for various reasons a person may become partially blind in varying degrees and the blindness may be more acute centrally than peripherally or vice versa. By properly designing multifocal corneal contact lenses having differently powered zones in accordance with my invention, it is possible to provide greater visual acuity for those that are partially blind, and for hyperopes and myopes with accommodation for both distant and close observing.

I disclose one form of such a bifocal corneal contact lens designated in general L having a central zone 30 and surrounding it an outer zone 32. The lens is concavo-convex in cross-section, illustrated circular in outline though it may have other shapes and in this instance the opposite surfaces of the zone 32 are plus powered by forming the outer surface on a smaller radius than the inner surface and with the curvatures related to secure the desired dioptric power. The central zone 30 is shown also concavo-convex but with the outer surface of greater radius than the outer surface of the zone 32 to provide less plus power and thus correct for hyperopia but with accommodation for distant vision. The outer zone 32 being higher plus power corrects for hyperopia but with accommodation for near vision. The diopter requirements are determined in the usual manner by trial sets of spectacle lenses and once the requirements are known, suitable tables are used by the contact lens laboratory to convert them for designing the equivalent contact lens.

Instead of the different zones having different curvatures to vary the power, they may have the same curvature but may be formed of different materials having different refractive indices and thus obtain the same optical results. Also, the power may be varied by different thicknesses of the material forming the lens.

To illustrate the action of the lens in FIG. 1, rays of light $a$ and $b$ are illustrated impinging the central zone 30 and passing through the lenses L and 18 to impinge the retinal area 22 and correct for far-sightedness with respect to distant objects. Peripheral vision on the other hand involves light rays such as $c$ which impinge the peripheral portion 20 of the retina surrounding the central vision area.

Referring to FIG. 2 it will be noted that the zone 30 is circular and the outer zone 32 is annular, the lens being of circular outline. While these are the preferred and usual shapes, others may be used for various reasons and the central zone 30 may be off center instead of centered as shown, or one zone may not surround the other if found desirable for various reasons.

Referring to FIG. 3, the action of the lens L is shown when the eyes are downcast as when reading. On some patients, as the eyes are rolled downwardly the lens L has a tendency to lag on the cornea due to the force of inertia. Also, the lower eyelid 40 which the lower edge of the lens engages tends to either hold the lens against rolling with the eye or provides some friction against movement of the lens with the eye as the lower margin of the lens enters between the cornea and the lower lid. By way of comparison a center line $d$ is shown in FIG. 1 which is the axis of the eye and also of the lens L. In FIG. 3 the axis of the lens L has shifted to $e$ compared to the eye axis $d$. The resulting operation is one in which the rays of light $a$ and $b$ from the object again impinge the central area 22 and in this instance it will be noted that the rays $a$ and $b$ are passing through the outer zone 32 of the lens L so that greater magnification for near vision is now had. It will also be obvious that regardless of the rotated position of the lens L, central vision is through the zone 32 when the eyes are downcast. Where a lens is provided that does not rotate on the eye the zone 32 may be in the lower part only of the lens as in spectacle type lenses. On other patients the lens tends to stay above a centered position on the cornea so that rolling of the eyes downwardly results in reading vision through the zone 32 even though the lens does not engage the lower eyelid 40.

In FIG. 4 I illustrate the comparative curvatures of the inside and outside surfaces of the lens L, the inside curvature of 30 and 32 being common and indicated 34, the outside curvature of 32 being 36 and the outside curvature of 30 being 38. Each of these curvatures are extended by dash lines indicated 34$^a$, 36$^a$ and 38$^a$ respectively, and by comparison it will be noted that the relative curvatures of 34 and 36 have a greater differential between them than 34 and 38 so that the outer zone 32 is of greater plus power than the central zone 30. Relative proportions of the lens illustrated are substantially normal for a lens approximately 8.5 mm. in size or diameter and having a central zone 30 about 3 mm. in diameter, although the thickness is somewhat exaggerated to better show the relationship of curvature. It is to be understood, however, that these are not limitations as to lens size as it may be as much as 2 mm. or 3 mm. larger or smaller, and the size of the zone 30 may be as much as 2 mm. or 3 mm. larger and still utilize my invention.

In the design of contact lenses, the inside curve 34 is considered a base curve and bears a certain relationship to the cornea that the lens fits, and the lens is powered either positively or negatively by the outer curve 36—38 in relation to the inner curve 34. Diametrical size of the lens must also be considered because of the position of the lower lid in relation to the iris of a given eye in order to provide the proper lag of the lens when the eye is downcast as in FIG. 3. The higher the lower lid, the smaller the lens must be in diameter and this also affects the base curve which factors are taken into consideration by the laboratory when designing the lens.

The lens L when fitted for bifocal use for either hyperopia (FIG. 4) or for myopia (FIGS. 5, 6 and 7) is preferably, though not necessarily, fitted so that it remains substantially centered on the cornea when the patient looks straight ahead rather than "riding high" as many corneal contact lenses are fitted. In this way the central zone 30 of the lens normally involves central vision but the outer zone involves central vision when the eyes are downcast and the lens strikes the lower lid 40. Even when a lens rides high relative to the cornea, it rides even higher when the eye is downcast so that the desired optical results are attained.

In the case of myopia the central zone of the lens is of course ground with negative dioptric value. In FIGS. 5, 6 and 7 the central zones 30$^a$ of the lenses L′, L″ and L‴ respectively have negative value. In FIG. 5 the outer zone has less negative value than the inner zone and the majority of lenses designed for myopes are of this type. Other myopic patients, however, may require no correction in the outer zone (32$^b$ illustrated in FIG. 6) so that the outer surface in this zone is parallel to the inner surface of the lens. In other cases a myope may require positive dioptric value in the outer zone 32$^c$ such as illustrated in FIG. 7.

Accordingly, in addition to the lens L shown in FIG. 4 having a positive central zone and a positive outer zone, the lens L′ of FIG. 5 has negative inner and outer zones, the lens L″ of FIG. 6 has a negative inner zone and a plano outer zone and the lens L‴ of FIG. 7 has a negative inner zone and a positive outer zone. In all cases, however, the central zone is for distant vision and the outer zone for downcast vision and each zone is designed dioptrically to meet the requirements of the individual eye. Likewise, the lens of FIG. 4 having two positive zones may be designed for certain individuals where either the central zone or the outer zone may be plano in character because of no correction required for either distance vision or near vision respectively.

The inner and outer zones may be ground on the lens blank where feasible, may be formed by a molding process, or the lens may be built up from different parts with the part 30 or 30a for instance inserted in the part 32 or 32a. When built up from different parts, the refractive index for the different parts and/or the thickness thereof may be selected so that the different prescriptions for the different zones are had with the same radius of curvature across the entire front surface of the lens. The curvatures illustrated on the drawings are arcs of circles but may be parabolic or hyperbolic in form particularly when the lenses are molded. One or more of the surfaces may also be plano instead of curved.

As far as the fit of the inside surface of the lens with respect to the cornea 10 is concerned, this forms no part of my present invention and may be determined by methods now known as disclosed in my co-pending application, Serial No. 701,153 filed December 6, 1957. In general, the lens should be as small as possible, compatible with such considerations as a size large enough that the edge of the lens does not seriously interfere with normal vision and large enough to provide enough area for retention of the lens on the cornea by capillary attraction in the lacrimal layer. The lens is desirably small in diameter to make it as light as possible and likewise is relatively thin (such as 0.1 to 0.3 mm. at the center) and, of course, for the higher powered plus lenses must be thicker in order to carry the curvatures out to the periphery of the lens without making the periphery too thin and fragile. In negative lenses, on the other hand, extreme thinness at the center is desired so long as there is no danger of the center breaking through, and the higher the negative power the thinner the center must be for the same over-all weight of lens.

The peripheral edges of the lenses are preferably rounded as shown in FIGS. 4 and 7, and/or may be bevelled outside or inside or both (FIGS. 5 and 6) as desired. These variations are considerations outside the scope of my present invention and are normally practiced by those in the field of contact lens fitting in order to properly adapt the lens to the individual eye and eliminate the tendency for the eyelid to catch on the edge of the lens and displace it from the cornea as well as to "loosen" a lens that is fitted too tightly and to take care of similar considerations.

Some changes may be made in the construction and arrangement of the parts of my bifocal corneal contact lens without departing from the real spirit and purpose of my invention, and it is my intention to cover by my claims any modified forms of structure or use of mechanical equivalents which may reasonably be included within their scope.

I claim as my invention:

1. A bifocal corneal contact lens of generally concavo-convex cross-section adapted to be retained on the cornea of the eye by capillary attraction produced by a lacrimal layer between the lens and the cornea, said lens having a posterior surface curved to fit the cornea of a patient to which the lens is applied with a tendency to remain centered thereon and having a single base curve in at least the optical area thereof, said lens being of a diameter greater than the normal pupil size and less than the limbal area of the eye, and having its lower peripheral edge normally positioned adjacent the upper edge of the lower eyelid when the lens is centered on the cornea and the patient is looking straight ahead, said posterior surface having its peripheral edge formed to provide clearance between the lens edge and the cornea to facilitate upward shifting movement of the lens whereby, when the eye moves to a downcast position, the lens will be shifted upwardly relative to the cornea by contact of its lower edge with the upper edge of the lower eyelid, said lens having a central zone and a concentric outer zone, said central zone being of substantially circular outline and of a diameter between 3 mm. and 6 mm. whereby central vision may shift therefrom to said outer zone upon engagement of the lower edge of said lens with the upper edge of the lower eyelid, said central zone being powered on the anterior surface for distance vision thereof with respect to the cornea of the patient, said outer zone being powered also on the anterior surface thereof for near vision with respect to such cornea, the anterior surface of said central zone having a radius of curvature flatter than the radius of curvature of the anterior surface of said outer zone to provide the respective distance and near vision powers, said outer zone completely surrounding said central zone so as to be equally effective for near vision in all positions of rotation of said lens with respect to the cornea.

2. A bifocal corneal contact lens of generally concavo-convex cross-section adapted to be retained on the cornea of the eye by capillary attraction produced by a lacrimal layer between the lens and the cornea, said lens having a posterior surface curved to fit the cornea of a patient to which the lens is applied with a tendency to remain centered thereon and having a single base curve in at least the optical area thereof, said lens having a maximum external dimension greater than the normal pupil size and less than the limbal area of the eye and having an outer lowermost portion normally positioned adjacent the upper edge of the lower eyelid when the lens is centered on the cornea and the patient is looking straight ahead, said posterior surface having its outer peripheral portion formed to provide clearance between the lens edge and the cornea to facilitate upward shifting movement of the lens whereby, when the eye moves to a downcast position the lens will be shifted upwardly relative to the cornea by contact of its lowermost portion with the upper edge of the lower eyelid, said lens having a central zone and an outer zone, said central zone being of substantially circular outline and of a diameter between 3 mm. and 6 mm. whereby central vision may shift therefrom to said outer zone upon engagement of the lowermost portion of said lens with the upper edge of the lower eyelid, said central zone being powered on the anterior surface for distance vision thereof with respect to the cornea of the patient, said outer zone being powered, also on the anterior surface thereof, for near vision with respect to such cornea, the anterior surface of said central zone having a radius of curvature flatter than the radious of curvature of the anterior surface of said outer zone to provide the respective distance and near vision powers.

References Cited in the file of this patent

UNITED STATES PATENTS 2,129,305     Feinbloom _____ Sept. 6, 1938

OTHER REFERENCES

Bier: "Contact Lens Routine and Practice," textbook printed in London, England, 1953, page 124 cited.

"Sidelights on Refraction," article by Williamson-Noble, Oxford Ophthalmological Congress, Transactions Ophthalmological Society, 1956, pages 633–647, all cited.